(12) United States Patent
Ji et al.

(10) Patent No.: US 12,187,593 B2
(45) Date of Patent: Jan. 7, 2025

(54) LIQUID DISPENSER

(71) Applicant: LG ELECTRONICS INC., Seoul (KR)

(72) Inventors: Jingyu Ji, Seoul (KR); Keunho Roh, Seoul (KR); Munjae Jang, Seoul (KR); Hyeonggeun Kim, Seoul (KR); Jiyeon Shin, Seoul (KR); Myeonghwan Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 17/709,707

(22) Filed: Mar. 31, 2022

(65) Prior Publication Data

US 2022/0324692 A1    Oct. 13, 2022

(30) Foreign Application Priority Data

Apr. 13, 2021 (KR) .......................... 10-2021-0048094

(51) Int. Cl.
*B67D 1/08* (2006.01)
*B67D 1/00* (2006.01)
*B67D 1/12* (2006.01)

(52) U.S. Cl.
CPC ......... *B67D 1/0857* (2013.01); *B67D 1/0014* (2013.01); *B67D 1/0895* (2013.01); *B67D 1/1277* (2013.01); *B67D 2210/0001* (2013.01)

(58) Field of Classification Search
None
See application file for complete search history.

(56) References Cited

U.S. PATENT DOCUMENTS

2011/0120921 A1* 5/2011 Kim .................... B67D 1/0895
                                                  210/138
2015/0225226 A1   8/2015 You et al.
(Continued)

FOREIGN PATENT DOCUMENTS

AU    2021257931       5/2022
CN    104833156        8/2015
(Continued)

OTHER PUBLICATIONS

Machine Translation of CN-112515485-A.*
(Continued)

*Primary Examiner* — Jeremy Carroll
(74) *Attorney, Agent, or Firm* — KED & ASSOCIATES, LLP (57) ABSTRACT

A dispenser includes a water supply flow path to guide water supplied from a water supply source toward a filter; an auxiliary flow path to branch off at the first point of the water supply flow path and then to merge into a second point located downstream of the first point; a flow switching valve installed at the first point to control a flow from the water supply flow path to the auxiliary flow path; a water ejection nozzle through which filtered is ejected; a hot water module forming a heating flow path and configured to heat the purified water into hot water; a hot water flow path configured to guide the hot water passing through the hot water module toward the water ejection nozzle; and a controller to control the flow switching valve and the hot water module.

19 Claims, 6 Drawing Sheets

(56) References Cited

U.S. PATENT DOCUMENTS

| | | | |
|---|---|---|---|
| 2017/0291807 A1† | 10/2017 | Jeon | |
| 2017/0320721 A1* | 11/2017 | Choi | H05B 6/365 |
| 2017/0335064 A1 | 11/2017 | Stapleton et al. | |
| 2018/0194608 A1 | 7/2018 | Jeon et al. | |
| 2018/0195793 A1* | 7/2018 | Kim | F24H 1/102 |
| 2019/0060801 A1* | 2/2019 | Jeon | B01D 35/30 |
| 2020/0270150 A1† | 8/2020 | Jeon | |
| 2021/0331908 A1* | 10/2021 | Lee | B67D 1/0869 |
| 2022/0127161 A1 | 4/2022 | Ji et al. | |

FOREIGN PATENT DOCUMENTS

| | | | | |
|---|---|---|---|---|
| CN | 105776685 | | 7/2016 | |
| CN | 106045158 | | 10/2016 | |
| CN | 107879423 | | 4/2018 | |
| CN | 108298602 | | 7/2018 | |
| CN | 112515485 | | 3/2021 | |
| CN | 112515485 A | * | 3/2021 | A47J 31/4403 |
| EP | 3 988 507 | | 4/2022 | |
| KR | 20-1998-022076 U | † | 7/1998 | |
| KR | 1998-0022076 | | 7/1998 | |
| KR | 10-2007-0083008 | | 8/2007 | |
| KR | 10-2013-0009329 | | 1/2013 | |
| KR | 20180066579 A | * | 6/2018 | B67D 1/0857 |
| KR | 10-2018-0103580 | | 9/2018 | |
| KR | 20180101093 A | * | 9/2018 | B01D 35/16 |
| KR | 10-2019-0010596 | | 1/2019 | |
| WO | WO 2019151624 | | 8/2019 | |

OTHER PUBLICATIONS

Machine Translation of KR-20180066579-A.*
Machine translation of KR-20180101093-A.*
European Search Report dated Aug. 31, 2022 issued in EP Application No. 22168085.3.
Chinese Office Action dated Mar. 31, 2023 issued in Application No. 202210276880.X.
Australian Office Action dated May 5, 2023 issued in Application No. 2022202423.
Chinese Office Action dated Aug. 29, 2023 issued in Application No. 202210276880.X.
Australian Office Action dated Mar. 8, 2024 issued in Application No. 2022202423.

\* cited by examiner
† cited by third party

LIQUID DISPENSER

CROSS-REFERENCE TO RELATED APPLICATION

The present application claims priority under 35 U.S.C. 119 and 35 U.S.C. 365 to Korean Patent Application No. 10-2021-0048094, filed on Apr. 13, 2021, which is hereby incorporated by reference in its entirety.

BACKGROUND

1. Field

The present disclosure relates to a liquid dispenser, such as a water purifier in which a heated liquid and a purified liquid at an ambient temperature are ejected through a single flow path.

2. Background

In general, a liquid dispenser may be a water purifier that filters raw water and supplies it to a user and is a device that allows the user to eject a desired amount of water at a desired temperature according to the user's manipulation. In such a water purifier, in a case where a user normally manipulates a lever or a button, filtered water may be ejected through a nozzle. In detail, the water purifier is configured so that the valve of the nozzle is opened and filtered water can be ejected while the user manipulates the lever or button, and the user can finish the manipulation of the lever or button while checking the amount of water filled in the cup or container. Such a water purifier may be provided as a water purifier itself or may be mounted on a refrigerator or the like.

In Prior Document 1 (Korean Patent Publication No. 2019-0010596), a water purifier is disclosed which includes a case having a storage space, a filter provided inside the case to purify water supplied from a water supply source, a water supply flow path configured to supply water supplied from the water supply source to the filter, a water supply valve provided on the water supply flow path to control the flow of water passing through the water supply flow path, a water ejection nozzle provided on the outside of the case and through which water passing through the filter is ejected, a water ejection flow path for supplying water that has passed through the filter to the outside of the case, a water ejection valve provided on the water ejection flow path to control the flow of water passing through the water ejection flow path, and a manipulation part configured to receive a washing command from a user, and a controller configured to control to intermittently open or close at least one of the water supply valve and the water ejection valve when the washing command is input to the manipulation part.

In addition, in Prior Document 2 (Korean Patent Publication No. 2007-0083008), a direct-type water purification apparatus employing an RO membrane module is disclosed. The disclosed direct-type water purification apparatus includes a purified water storage tank in which purified water is temporarily stored, a first connection pipe providing a flow path to supply purified water flowing through a purified water discharge pipe to the purified water storage tank, a second connection pipe providing a flow path so that a purified water stored in the purified water storage tank flows into the RO membrane module, a booster pump installed on the path of the raw water supply pipe to increase the supply pressure of raw water, and a controller configured to control to supply purified water discharged through the purified water discharge pipe to the purified water storage tank by detecting when the faucet is locked and to supply the stored purified water to the RO membrane module in a case where a predetermined amount of purified water is stored in the purified water storage tank.

In a case of the conventional water purifier as described above, at the time of ejection of the purified water, when the 'water ejection' button is pressed after the 'water purification' button is selected, the water purification valve is opened, purified water flows through the purified water flow path, and purified water is ejected through the water ejection nozzle. In addition, in the case of the conventional water purifier as described above, at the time of ejection of hot water, when the 'water ejection' button is pressed after the 'hot water' button is selected, the hot water valve is opened, the hot water heated in the hot water tank flows through the hot water flow path, and the hot water is discharged through the water ejection nozzle.

In other words, in the case of the conventional water purifier, the hot water flow path and the intermediate flow path are separately formed, the hot water is supplied to the water ejection nozzle through the hot water flow path and the hot water valve, and the purified water is supplied to the water ejection nozzle through the intermediate flow path and the water purification valve.

As described above, a conventional water purifier providing cold water, purified water, and hot water ejection functions separately includes a cold water flow path, an intermediate flow path, and a hot water flow path, respectively. This is to distinguish the flow paths of water with different temperatures. As such, it was taken for granted to have a structure in which flow paths are provided for each temperature of the water to be ejected, but, in configuring each flow path, there are problems in that complexity increases, space utilization is disadvantageous, the unit cost increases, and the like.

BRIEF DESCRIPTION OF THE DRAWINGS

The embodiments will be described in detail with reference to the following drawings in which like reference numerals refer to like elements wherein.

DETAILED DESCRIPTION

Hereinafter, specific embodiments of the present disclosure will be described in detail with reference to the drawings. However, the spirit of the present disclosure is not limited to the embodiments presented below, and those skilled in the art who understand the spirit of the present disclosure may easily implement other embodiments included within the scope of the same spirit by adding, changing, deleting, and supplementing components but this may also be included within the scope of the present disclosure.

The drawings accompanying the following embodiments are embodiments of the same inventive idea, but within the scope that the inventive idea is not damaged, in order to be easily understood, the expression of minute parts may be expressed differently for each drawing, and, according to the drawing, a specific part may not be displayed or may be exaggerated according to the drawing.

Figure 1:
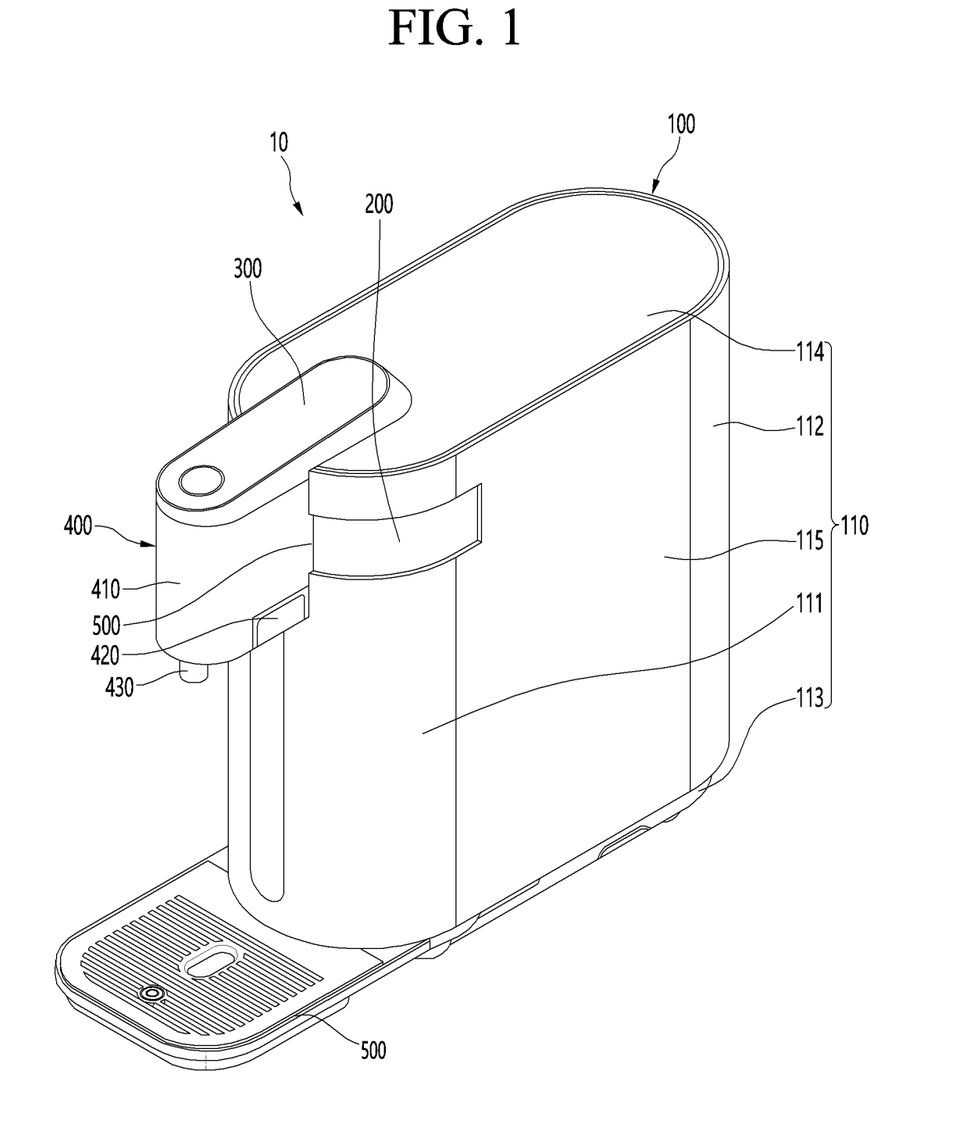
FIG. 1 is a perspective view illustrating a water purifier according to an embodiment of the present disclosure.
Figure 2:
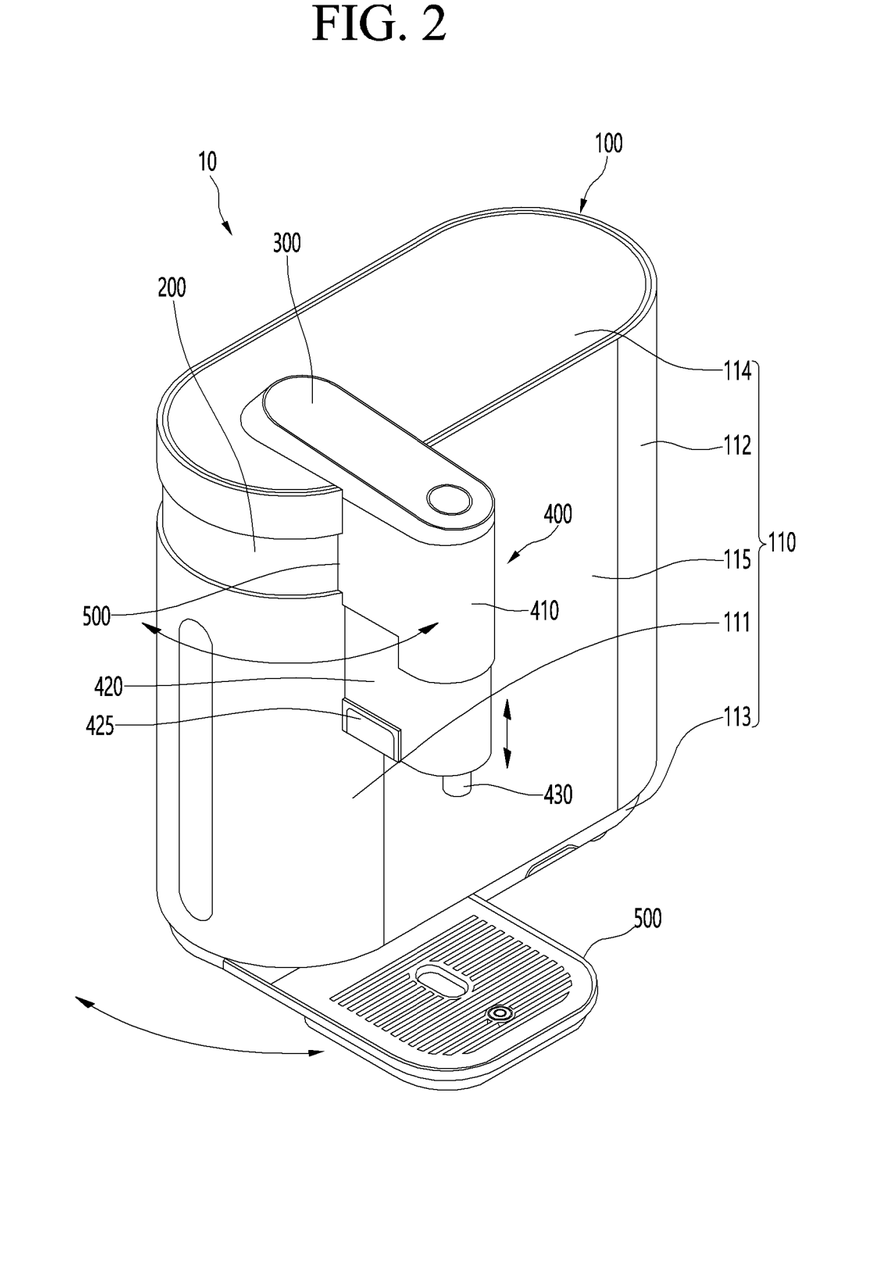
FIG. 2 is a perspective view illustrating a state where the position of the water ejection nozzle of the water purifier according to an embodiment of the present disclosure is changed.
Figure 3:
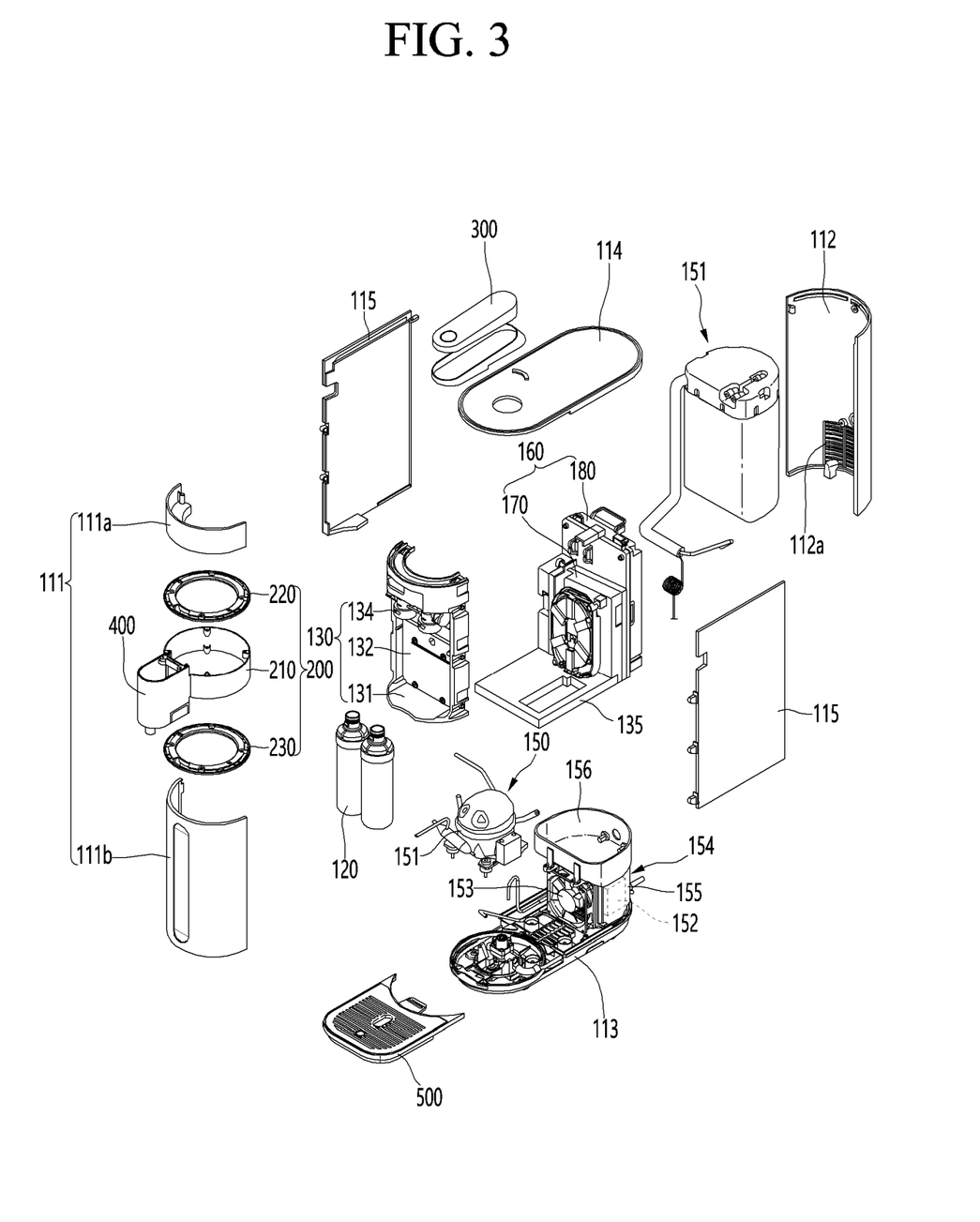
FIG. 3 is an exploded perspective view illustrating a water purifier according to an embodiment of the present disclosure.
Figure 4:
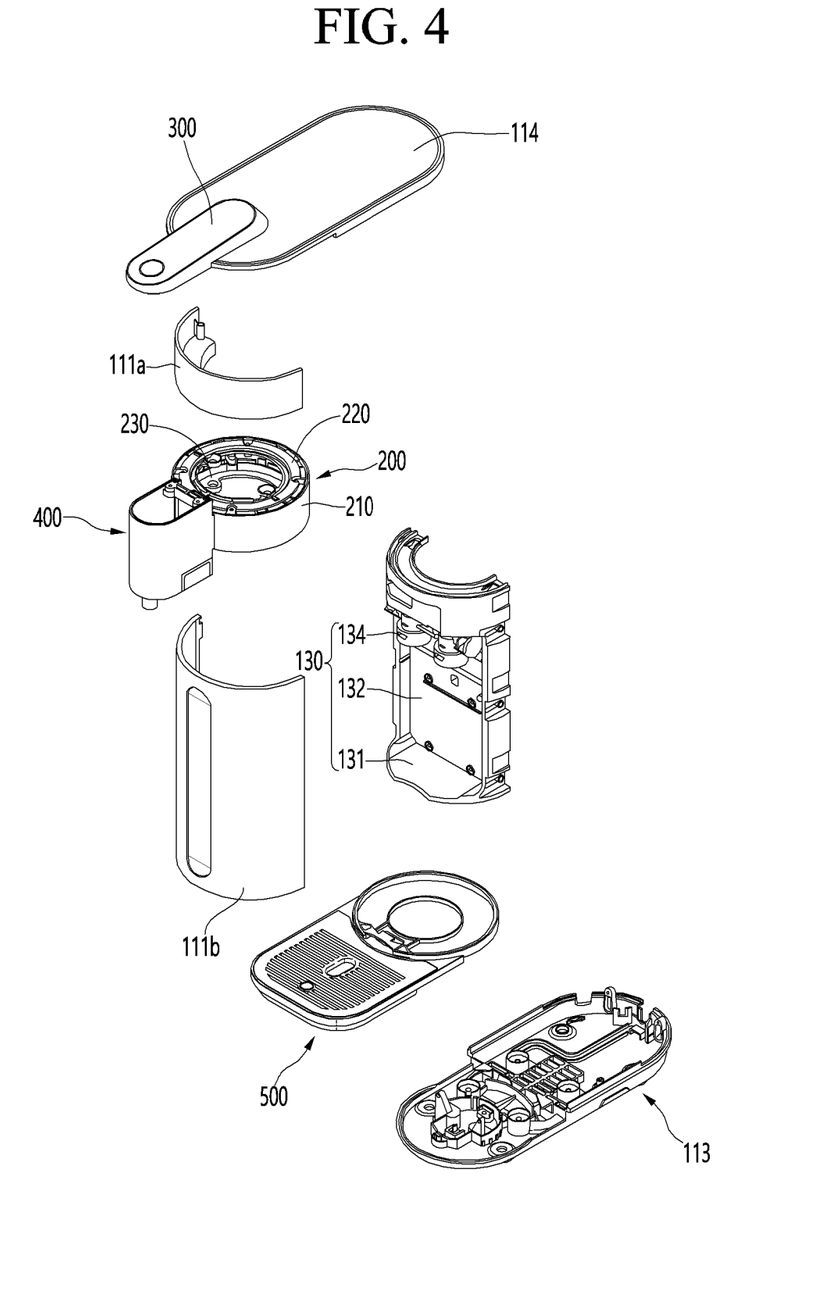
FIG. 4 is an exploded perspective view illustrating a state of extracting a partial region of FIG. 3.

FIG. 1 is a perspective view illustrating a liquid dispenser, such as a water purifier, according to an embodiment of the present disclosure, FIG. 2 is a perspective view illustrating a state where the position of the water ejection nozzle of the water purifier according to an embodiment of the present disclosure is changed, FIG. 3 is an exploded perspective view illustrating a water purifier according to an embodiment of the present disclosure, and FIG. 4 is an exploded perspective view illustrating a state of extracting a partial region of FIG. 3.

Referring to FIGS. 1 to 2, the water purifier (or liquid dispenser) according to an embodiment of the present disclosure includes a water purifier main body (or main body) 100, a rotator 200 disposed inside the water purifier main body 100 and rotatably mounted on the water purifier main body 100, a manipulation part (or handle) 300 of which at least a portion is disposed above the rotator 200, a fixed cover 410 of which at least a portion is fixed to the rotator 200, protrudes toward the front of the water purifier main body 100, and in which at least a portion of the manipulation part 300 is disposed on the upper end, and a water ejection module (or liquid ejection module) 400 having a raising and lowering cover 420 that raises and lowers while being supported in contact with the fixed cover 410 and a water ejection nozzle (also referred to as a liquid ejection nozzle or nozzle) 430 mounted on the lower end of the raising and lowering cover 420.

According to the present disclosure, the water ejection module 400 may rotate in the left and right direction with respect to the water purifier main body 100 by the rotator 200. In addition, the raising and lowering cover 420 and the water ejection nozzle 430 may be raised and lowered with respect to the fixed cover 410 fixed to the rotator 200. Accordingly, the position of the water ejection nozzle 430 may be varied in the left and right direction, and the position of the water ejection nozzle 430 may also be varied in the vertical direction.

The rotator 200 may include a circular rotator main body 210 having a hollow shape, and an upper disk 220 fixed to an upper part of the rotator main body 210 or a lower disk 230 fixed to a lower part of the rotator main body 210. The rotator main body 210 and the upper disk 220 or the lower disk 230 may be combined into one module by assembling or the like.

In addition, the manipulation part 300 may be rotatably disposed on the upper surface of the water purifier main body 100. The manipulation part 300 may be disposed above the rotator 200. In addition, the manipulation part 300 may be disposed on the upper end of the water ejection module 400 protruding forward of the water purifier main body 100. In detail, the manipulation part 300 may be disposed on the upper end of the fixed cover 410. Accordingly, the manipulation part 300 has a structure in which, when the water ejection module 400 rotates, the rotator 200 and the manipulation part 300 connected to the water ejection module 400 rotate at the same time.

At the lower end of the raising and lowering cover 420, a grip part 425 protruding outward or concave inward may be formed. With the configuration of the grip part 425, the user can raise or lower the raising and lowering cover 420 by holding the lower end of the raising and lowering cover 420 without slipping.

Meanwhile, the water purifier main body 100 includes a housing 110 and a filter 120. The outer shape of the water purifier 10 may be formed by the housing 110. The housing 110 includes a front cover 111 forming an outer appearance of the front surface, a rear cover 112 forming an outer appearance of the rear surface, a base 113 forming a lower surface, a top cover 114 forming an upper surface, and side panels 115 forming both side surfaces in the left and right direction. The front cover 111 and the rear cover 112, the base 113 and the top cover 114, and the pair of side panels 115 may be assembled with each other to form the outer appearance of the water purifier 10.

At this time, the front or rear ends of the base 113 and the top cover 114 may be formed to be rounded, and the front cover 111 or the rear cover 112 may be formed to be convex forward or rearward, respectively, to have a curvature corresponding to the front end or rear end of the base 113 and the top cover 114 which are formed to be rounded. A filter 120 configured to purify and discharge raw water flowing thereinto from the outside is provided inside the housing 110.

On the front surface of the water purifier main body 100, the water ejection module 400 is disposed to protrude forward, and purified water at an ambient temperature is capable of being ejected while passing through the filter through the water ejection nozzle 430 formed to protrude downward at the lower end of the water ejection module 400. In addition, purified water purified while passing through the filter may be cooled or heated and then supplied to the water ejection nozzle 430 in the form of cold water or hot water.

Meanwhile, the front cover 111 may include an upper cover 111a and a lower cover 111b. For reference, in a state where the water ejection module 400 rotates to both sides, a container such as a cup can be stably supported by the flat side panel 115.

The water ejection module 400 is configured to rotate together with the rotator 200. Accordingly, the user can rotate the water ejection module 400 at a desired angle according to the installation state or installation environment of the water purifier 10.

In addition, the manipulation part 300 disposed above the rotator 200 or disposed above the fixed cover 210 has a structure that rotates together with the water ejection module 400 and the rotator 200. In addition, the water ejection module 400 has a structure that raises and lowers while being fixed to the outside of the rotator 200.

Referring to FIGS. 3 to 4, a filter 120 for water purification and a filter bracket 130 to which a plurality of valves and the like are mounted are provided inside the housing 110. The filter bracket 130 may include a bottom part 131 coupled to the base 113 and a filter accommodation part 132 in which the filter 120 is accommodated.

The bottom part 131 is formed to correspond to the shape of the tip of the base 113 and is coupled to the base 113. The mounting position of the filter bracket 130 may be fixed by the coupling of the bottom part 131, and the shape of the bottom surface of the filter accommodation part 132 may be formed.

The filter accommodation part 132 is formed to extend in the vertical direction and forms a space recessed from the front (left in the drawing) to the rear (right in the drawing) so that the filter 120 can be accommodated. A plurality of filters 120 may be mounted on the filter accommodation part 132. The filter 120 is for purification of supplied raw water (tap water) and may be configured to combine filters having various functions.

In addition, the filter accommodation part 132 may further include a filter socket 134 to which the filter 120 is mounted, a pipe through which purified water flows is provided in the filter socket 134, and the pipe may be connected to a plurality of valves (not illustrated). Accordingly, the raw water passes through the filter 120 in turn and then can be directed to a valve (not illustrated) for water supply.

A plurality of valves (not illustrated) may be provided on the rear surface (right side of the drawing) of the filter accommodation part 132, and the valves (not illustrated) may supply purified water passing through the filter 120 into cold water module (or cooling module) 150 configured to generate cold water (or cooled liquid) or the hot water module (or heating module) 170 configured to generate hot water (or heated liquid). In addition, purified water (or ambient temperature liquid) may be directly supplied to the water ejection module 400. For example, the cold water module 150 may include a thermoelectric element to generate cold water.

As another example, the cold water module 150 may include a compressor 151 to generate cold water. The cold water module 150 may be understood as a configuration including a cooling tank 151, a compressor 151, a condenser 152, a cooling fan 153, and the like. A compressor 151 and a condenser 152 may be provided on the upper surface of the base 113. In addition, a cooling fan 153 is provided between the compressor 151 and the condenser 152 to enable cooling of the compressor 151 and the condenser 152. The compressor 151 may be an inverter type compressor capable of adjusting the cooling capacity by varying the frequency. Therefore, cooling of the purified water can be efficiently performed, thereby being capable of reducing power consumption.

In addition, the condenser 152 may be located at the rear of the base 113 and may be located at a position corresponding to the discharge port 112*a* formed in the rear cover 112. The condenser 152 may be formed by bending a flat tube type refrigerant pipe a plurality of times in order to efficiently use space and improve heat exchange efficiency at the same time and is configured to be capable of being accommodated in the condenser bracket 154.

A condenser mounting part 155 to which the condenser 152 is fixed and a tank mounting part 156 to which a cooling tank 151 configured to make cold water can be mounted are formed in the condenser bracket 154. The condenser mounting part 155 forms a space having a shape corresponding to the overall shape of the condenser 152 to accommodate the condenser 152. In addition, the condenser mounting part 155 is formed such that portions facing the cooling fan 153 and the discharge port 112*a* are opened, respectively, so that the condenser 152 can be effectively cooled.

In addition, the tank mounting part 156 is formed above the condenser bracket 154, that is, above the condenser mounting part 155. The lower end part of the cooling tank 151 is inserted into the tank mounting part 156 so that the tank mounting part 156 fixes the cooling tank 151.

The cooling tank 151 is configured to cool the purified water to make cold water, and the cooling water for heat exchange with the flowing purified water thereinto is filled. In addition, an evaporator for cooling the coolant may be accommodated in the cooling tank 151. In addition, the purified water may be cooled by allowing the purified water to pass through the inside of the cooling tank.

A support plate 135 extending toward the cooling tank 151 is further disposed on one side of the filter bracket 130. The support plate 135 is provided above the compressor 151 and extends from the filter bracket 130 to the condenser bracket 154 to provide a space in which the heating and control module 160 is mounted.

The heating and control module 160 may include a hot water module 170 configured to make hot water and a controller 180 configured to control the overall operation of the water purifier 10. The hot water module 170 and the controller 180 may be coupled to each other to form a single module and may be mounted on the support plate 135 in a coupled state.

The hot water module 170 is configured to heat purified water or other liquid. For example, the hot water module 170 is configured to heat water in an induction heating (IH) method. The hot water module 170 can heat water immediately and at a high speed when hot water is ejected, and it is possible to heat purified water to a desired temperature by controlling the output of a magnetic field and provide it to the user. Accordingly, it is possible to eject hot water of a desired temperature according to the user's manipulation. As another example, the hot water module 170 may include a thermoelectric element to heat water.

The controller 180 is configured to control the operation of the water purifier 10 and is configured to control the compressor 151, the cold water module 150 including the cooling fan 153, various valves and sensors, the hot water module 170, and the like. The controller 180 may be modularly configured by a combination of PCBs divided into a plurality of parts for each function.

Referring back to FIGS. 1 to 4, a tray 500 is disposed at the lower end of the front cover 111 to protrude forward. In addition, the tray 500 may be positioned vertically below the water ejection module 400. In addition, the tray 500 may be rotated by a user's manipulation and may be separated from the base 113. The tray 500 may form a grill vertically below the water ejection nozzle 430 so that water falling from the water ejection nozzle 430 can be stored.

The tray 500 may be rotatably disposed on the base 113 or the front cover 111. Accordingly, when the water ejection module 400 rotates, the tray 500 may also rotate along the water ejection module 400, and the tray 500 may be positioned vertically below the water ejection module 400. The water ejection module 400, the manipulation part 300, the rotator 300, and the tray 900 may rotate with respect to the same rotational center.

Meanwhile, the manipulation part 300 is provided as a touch panel, and may include a capacity button for selecting the water ejection capacity, a hot water button for selecting hot water and further selecting the temperature of the hot water to be ejected, a water purification button for selecting purified water, a cold water button for selecting cold water, a continuous button for selecting continuous water ejection, and a self-care button for inputting a sterilization command and/or a washing command.

Also, the controller 180 may include an inverter. The inverter may adjust the amount of heating by controlling the amount of current applied to the heating source of the hot water module 170. In other words, the output of the hot water module 170 may be adjusted by the inverter. In a case where the heating amount is adjusted in this way, the water may be heated to a temperature desired by the user.

In addition, the controller 180 may further include a noise filter. The noise filter serves to remove noise from a signal including noise generated by a magnetic field generated by a current applied to the hot water module 170. The noise filter may control noise from control signals which are output from the controller 180 and applied to various valves. In addition, the controller 180 may include a timer for measuring the elapsed time after the hot water is ejected.

Figure 5:
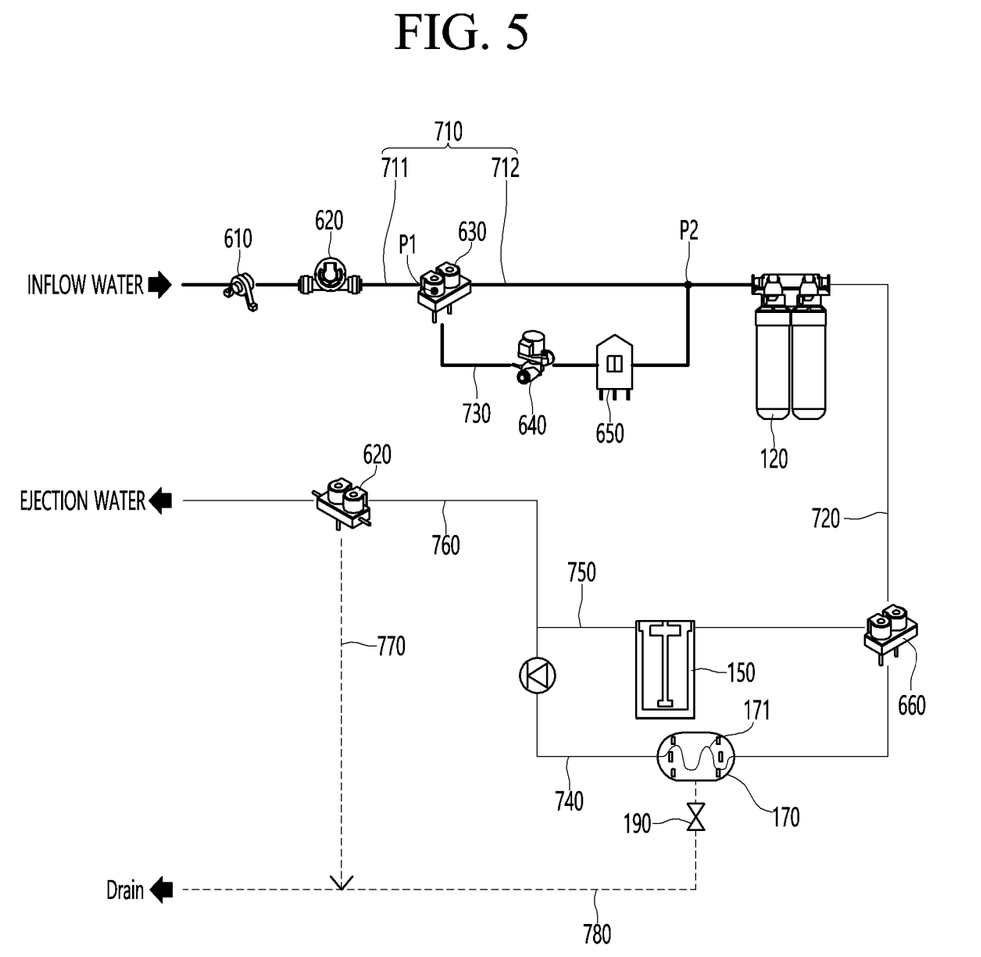
FIG. 5 is a water pipe diagram of a water purifier according to an embodiment of the present disclosure.
Figure 6:
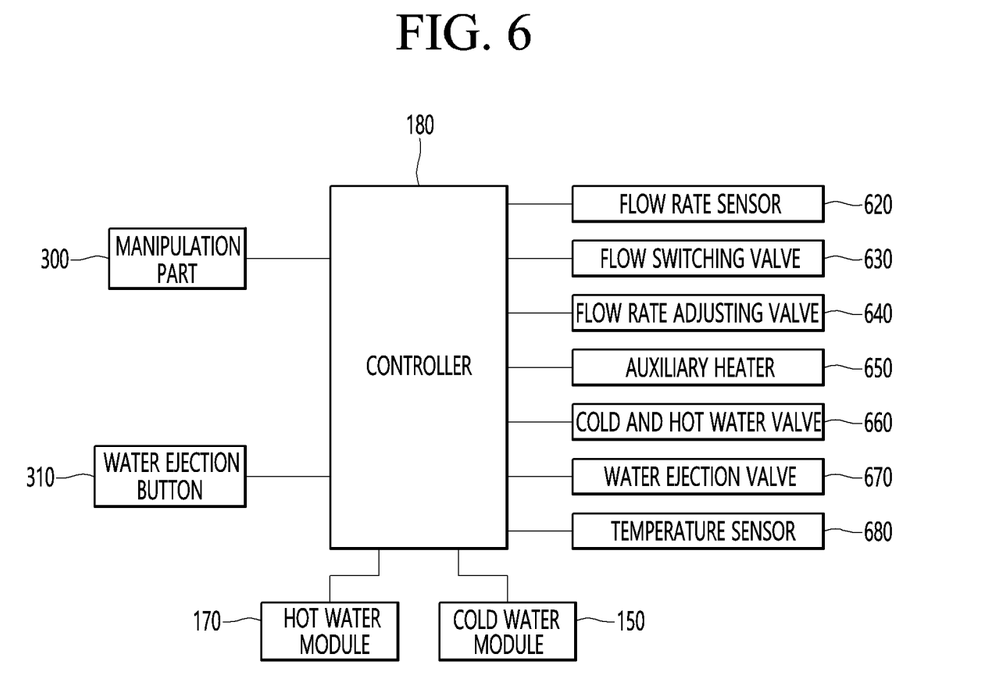
FIG. 6 is a block diagram illustrating the configuration of a water purifier according to an embodiment of the present disclosure.

FIG. 5 is a water pipe diagram of a water purifier according to an embodiment of the present disclosure, and FIG. 6 is a block diagram illustrating the configuration of a water purifier according to an embodiment of the present disclosure. Referring to FIG. 5, the water purifier according to the present disclosure ejects hot water and purified water, wherein the hot water and purified water are ejected through one flow path.

First, the water supplied from the water supply source is guided toward the filter 120 through the water supply flow path (or liquid supply flow path) 710. In addition, the purified water that has passed through the filter 120 flows through the intermediate flow path 720.

The intermediate flow path 720 has one side connected to the outlet of the filter 120, and the other side connected to the inlet of the hot water module 170, so that water passing through the filter 120 is guided to the hot water module 170. In addition, purified water or hot water passing through the hot water module 170 is supplied to the water ejection nozzle 430 through the hot water flow path (or hot liquid flow path) 740.

The hot water flow path 740 is connected to the water ejection nozzle 430 through the water ejection flow path (or liquid ejection flow path) 760. Accordingly, the water passing through the hot water module 170 and the hot water flow path 740 passes through the water ejection flow path 760 and then is discharged to the water ejection nozzle 430. At this time, when power is supplied to the hot water module 170 and purified water is heated in the hot water module 170, the hot water is ejected through the water ejection nozzle 430.

In addition, when the power to the hot water module 170 is blocked, the purified water that has passed through the hot water module 170 is not heated, and water is ejected to the water ejection nozzle 430 in a state of purified water. In other words, in the case of the present disclosure, hot water and purified water are ejected through one flow path. In a case of hot water and purified water, both hot water and purified water are ejected to the water ejection nozzle 430 through the water supply flow path 710, the filter 120, the intermediate flow path 720, the hot water module 170, the hot water flow path 740, and the water ejection flow path 760.

The difference is whether the hot water module 170 operates. When purified water is ejected, the controller 180 switches the hot water module 170 to an off state, so that the hot water module 170 does not operate and the purified water passing through the hot water module 170 flows to water ejection flow path 760 in a state of purified water. On the other hand, when hot water is ejected, the controller 180 switches the hot water module 170 to an on state, so that the hot water module 170 operates and the purified water passing through the hot water module 170 is heated with hot water.

The hot water module 170 includes a hot water tank. A heating flow path 171 through which the purified water passing through the filter 120 passes is formed in the hot water tank, and the purified water passing through the heating flow path 171 is heated with hot water when hot water is ejected. On the other hand, the purified water that has passed through the heating flow path 171 when purified water is ejected maintains the purified water state without a change in temperature.

Referring to FIG. 5, it includes a hot water flow path 740 and a water ejection flow path 760 for guiding purified water or hot water passing through the hot water module 170 toward the water ejection nozzle 430. In other words, purified water or hot water discharged from the hot water module 170 is discharged to the water ejection nozzle 430 through the hot water flow path 740 and the water ejection flow path 760.

The controller 180 controls the operation of the hot water module 170. When purified water is ejected, the controller 180 turns off the heating source of the hot water module 170, and the purified water discharged from the hot water module 170 is discharged to the water ejection nozzle 430 through the hot water flow path 740 and the water ejection flow path 760. In other words, when purified water is ejected, the heating source of the hot water module 170 is turned off, so that when purified water passes through the heating flow path 171 of the hot water module 170, the purified water is not heated and can be ejected in a state of purified water. In addition, purified water may be supplied to the water ejection nozzle 430 through the hot water flow path 740 and the water ejection flow path 760.

In addition, when hot water is ejected, the controller 180 turns on the heating source of the hot water module 170, and the hot water discharged from the hot water module 170 is ejected to the water ejection nozzle 430 through a hot water flow path 740 and a water ejection flow path 760. In other words, when the heating source of the hot water module 170 is turned on, the purified water is heated when passing through the heating flow path 171 of the hot water module 170 and discharged in a state of hot water. In addition, the hot water discharged from the hot water module 170 may be supplied to the water ejection nozzle 430 through the hot water flow path 740 and the water ejection flow path 760.

Again, referring to FIG. 5, the water purifier according to the present disclosure may further include an auxiliary flow path 730 that is merged into the second point P2 of the water supply flow path 710 located at the rear end of the first point P1 with respect to the flow direction of water after branching from the first point P1 of the water supply flow path 710. In addition, a flow rate adjusting valve 640 may be installed in the auxiliary flow path 730. The flow rate adjusting valve 640 may control the flow rate of water passing through the auxiliary flow path 730. For example, the flow rate adjusting valve 640 may adjust the flow rate of water passing through the auxiliary flow path 730 to be low.

The controller 180 is connected to the flow rate adjusting valve 640 to control the flow rate adjusting valve 640. In detail, the controller 180 may open or block the flow rate adjusting valve 640. In addition, the controller 180 may adjust the degree of opening of the flow rate adjusting valve 640, and consequently control the flow rate of water passing through the auxiliary flow path 730.

In addition, a temperature sensor 680 for detecting the temperature of water passing through the auxiliary flow path 730 may be installed in the auxiliary flow path 730. The temperature sensor 680 may be installed integrally with the flow rate adjusting valve 640.

For reference, the temperature sensor 680 may be installed in at least one of various water supply flow paths 710, intermediate flow paths 720, hot water flow paths 740, and water ejection flow paths 760. In addition, the temperature sensor 680 may be installed in the hot water module 170 or may be installed in the water ejection valve 670 to be described later.

In addition, the controller 180 may be connected to the temperature sensor 680 to receive information on the temperature of water detected by the temperature sensor 680. In addition, by utilizing the received temperature information, it is possible to control the output of the hot water module 170 or the auxiliary heater 650 to be described later.

In addition, a flow switching valve 630 may be installed at the first point P1. The flow switching valve 630 may control the flow of water flowing from the water supply flow path 710 to the auxiliary flow path 730.

In addition, the controller 180 may control the operation of the flow switching valve 630. For example, the flow switching valve 630 may have one inlet and two outlets. In addition, the inlet of the flow switching valve 630 may be connected to the water supply flow path 710, one of the two outlets may be connected again to the water supply flow path 710, and the other may be connected to the auxiliary flow path 730.

The controller 180 may open and close the inlet of the flow switching valve 630 and may open and close the outlet of the flow switching valve 630. The controller 180 may select and open only any one of the outlets of the flow switching valve 630 and block the other one thereof. The controller 180 may open all outlets of the flow switching valve 630 and may block all outlets of the flow switching valve 630. Accordingly, the water flowing into the flow switching valve 630 may be transferred to the water supply flow path 710 or may be transferred to the auxiliary flow path 730.

The water supply flow path 710 may include a first water supply flow path 711 for guiding water toward the flow switching valve 630 with respect to the flow switching valve 630, and a second water supply flow path 712 for guiding water discharged from the flow switching valve 630 toward the filter 120. For example, the water flowing into the flow switching valve 630 through the first water supply flow path 711 may flow only in the second water supply flow path 712 without flowing in the direction of the auxiliary flow path 730.

As another example, the water flowing into the flow switching valve 630 through the first water supply flow path 711 flows only in the direction of the auxiliary flow path 730 and may not flow into the second water supply flow path 712. As another example, the water flowing into the flow switching valve 630 through the first water supply flow path 711 can partially flow in the direction of the auxiliary flow path 730 and also partially flow in the direction of the second water supply flow path 712.

When hot water is ejected, the controller 180 may control the flow switching valve 630 so that the water flowing thereinto through the first water supply flow path 711 passes through the auxiliary flow path 730. At this time, the water flowing into the flow switching valve 630 is not discharged to the second water supply flow path 712, but is discharged only to the auxiliary flow path 730.

In addition, the water passing through the auxiliary flow path 730 may be supplied to the filter 120 after being merged into the second water supply flow path 712 at the second point P2. In addition, when purified water is ejected, the controller 180 may control the flow switching valve 630 so that the water flowing thereinto through the first water supply flow path 711 flows only through the second water supply flow path 712.

At this time, the water flowing into the flow switching valve 630 is not discharged to the auxiliary flow path 730, but is discharged only to the second water supply flow path 712. In addition, the water discharged to the second water supply flow path 712 may be supplied to the filter 120.

In general, in a case of purified water, purified water passes through the filter 120 and is then supplied to the water ejection nozzle 430 through a flow path. Therefore, there is no need to adjust the flow rate of water passing through the flow path, the larger the flow rate, the better.

However, in the case of hot water, hot water passes through the filter 120, and is then heated to hot water, and then supplied to the water ejection nozzle 430. Therefore, in order to increase the hot water temperature, it is necessary to adjust the flow rate of water flowing into the hot water module 170 to be lower than that of purified water.

In this situation, in a case where a flow rate adjusting valve is installed in the water supply flow path 710 for supplying water to the filter 120 to adjust the flow rate supplied to the filter 120 to be low, the hot water temperature increases, so that the hot water condition can be satisfied. However, even when purified water is ejected, there is also a problem in that the purified water flow rate is reduced due to the low adjusting flow rate.

In order to solve this problem, in the present disclosure, when purified water is ejected, water flowing thereinto through the first water supply flow path 711 is supplied to the filter 120 through the second water supply flow path 712. Since the flow rate adjusting valve is in a state of being not installed in the second water supply flow path 712, a situation in which the purified water flow rate is lowered is prevented, and the purified water flow rate condition can be satisfied.

On the other hand, when hot water is ejected, the water flowing thereinto through the first water supply flow path 711 is supplied to the filter 120 through the auxiliary flow path 730. A flow rate adjusting valve 640 is installed in the auxiliary flow path 730, and the flow rate adjusted to a low level by the flow rate adjusting valve 640 flows into the filter 120, and the flow rate supplied to the hot water module 170 is lowered, and thus the hot water temperature may increase and the hot water temperature condition may be satisfied.

In other words, in the case of the present disclosure, in a state where the path of water flowing from the water supply flow path 710 to the filter 120 is divided into two branches, when purified water is ejected, water flows only through the water supply flow path 710 and thus the flow rate is not reduced, and when hot water is ejected, the water from the water supply flow path 710 flows to the auxiliary flow path 730 to lower the flow rate, thereby satisfying the temperature condition of the hot water.

Meanwhile, as described above, the purified water discharged from the filter 120 flows toward the hot water module 170 through the intermediate flow path 720. Then, the water flowing into the hot water module 170 is heated and discharged in the state of hot water or is discharged in the state of purified water without being heated to flow the hot water flow path 740.

The hot water or purified water flowing through the hot water flow path 740 flows through the water ejection flow path 760 and then is supplied to the outside of the water purifier through the water ejection nozzle 430. One side of the water ejection flow path 760 is connected to the hot water flow path 740 and the other end thereof is connected to the water ejection nozzle 430. In addition, a water ejection valve 670 for controlling the flow of water flowing toward the water ejection nozzle 430 may be installed in the water ejection flow path 760.

The controller 180 may control the operation of the water ejection valve 670. In detail, the controller 180 may control the water ejection valve 670 to be opened when purified water, hot water, or cold water is ejected, and control the water ejection valve 670 to be blocked in a standby state where the water ejection is not performed.

Meanwhile, after the hot water is ejected, the hot water module 170 is in a heated state, and the hot water flow path 740, the hot water module 170, and the water ejection flow path 760 are also filled with hot water. In this situation, when the user ejects purified water, a problem occurs in that the hot water in the hot water flow path 740 or the hot water module 170 is ejected through the water ejection nozzle 430 before the purified water is ejected.

Therefore, after hot water is ejected, before purified water is ejected, it is necessary to drain the hot water (residual water) remaining in the hot water flow path 740, the hot water module 170, and the water ejection flow path 760. To this end, the water purifier of the present disclosure includes a drain flow path 770.

In addition, the water ejection valve 670 is provided as a three-way valve, and a drain flow path 770 may be connected to the water ejection valve 670. In addition, the water flowing into the water ejection valve 670 may flow toward the water ejection nozzle 430 or may flow into the drain flow path 770.

The water ejection valve 670 may have one inlet and two outlets. In addition, the inlet of the water ejection valve 670 is connected to the water ejection flow path 760 extending toward the hot water flow path 740. Then, one of the two outlets is connected again to the water ejection flow path 760 extending toward the water ejection nozzle 430, and the other one thereof is connected to the drain flow path 770.

The controller 180 may open and close the inlet of the water ejection valve 670 and may open and close the outlet of the water ejection valve 670. The controller 180 may select and open only any one of the outlets of the water ejection valve 670 and block the other one thereof. The controller 180 may open all outlets of the water ejection valve 670 and may block all outlets of the water ejection valve 670.

Accordingly, the water flowing into the water ejection valve 670 may be discharged through the water ejection flow path 760 extending toward the water ejection nozzle 430 and discharged to the water ejection nozzle 430 or discharged to the drain flow path 770. For example, when hot water is ejected, the water ejection valve 670 may be opened to discharge water through the water ejection flow path 760 extending toward the water ejection nozzle 430. As another example, when the hot water ejection is finished, the outlet of the outlet valve 670 connected to the drain flow path 770 is opened, and residual water in the hot water flow path 740, the water ejection flow path 760, or the hot water module 170 can be drained.

As described above, when the drain is performed after the hot water is ejected, the hot water flow path 740, the water ejection flow path 760, or the hot water module 170 is in a state of being filled with purified water or in a state of being emptied. Accordingly, it is possible to prevent a problem in that the temperature of purified water increases due to the high-temperature residual water when purified water is ejected after hot water is ejected.

If, after hot water is ejected, purified water is ejected in a state where the drain is not performed, even in a state where the hot water module 170 is turned off, since a high temperature residual water is in a state of being remained in the hot water flow path 740, the water ejection flow path 760, or the hot water module 170, there is a problem that high-temperature water is ejected through the water ejection nozzle 430.

For reference, the drain may be performed until the residual water in the hot water tank is discharged. In the case of the present disclosure, when the ejection of hot water is finished, drain may be performed regardless of whether purified water is ejected. In other words, when hot water is ejected, the hot water module 170 operates, and the outlet of the water ejection valve 670 toward the water ejection nozzle 430 is opened.

In addition, when the hot water ejection is finished, the hot water module 170 stops operating, and the outlet of the water ejection valve 670 toward the drain flow path 770 is opened, so that the hot water in the hot water flow path 740 or the hot water module 170 is drained through the drain flow path 770. In addition, when a preset drain time has elapsed, the outlet of the water ejection valve 670 toward the drain flow path 770 is blocked.

In addition, in the case of the present disclosure, when the ejection of hot water is finished and the ejection of the purified water is performed, the elapsed time is checked after the hot water is ejected, and the drain can be selectively performed according to the elapsed time. In addition, in the case of the present disclosure, when the hot water ejection is finished and the ejection of purified water is performed, the temperature of the residual water of the hot water flow path 740, the water ejection flow path 760, the hot water module 170, or the water ejection valve 670 is checked, and the drain may be selectively performed according to the checked temperature.

Again, referring to FIG. 5, the water purifier according to the present disclosure may have a cold water ejection function. To this end, the water purifier may include a cold water flow path (or cold liquid flow path) 750 having one side which is branched from the intermediate flow path 720 and the other side which is merged into the water ejection flow path 760 and a cold water module 150 configured to cool the purified water passing through the cold water flow path 750 to cold water.

In addition, in the intermediate flow path 720, a cold and hot water valve 660 may be installed at a branch point of the cold water flow path 750. The controller 180 controls the operation of the cold and hot water valve 660. For example, when hot water is ejected or purified water is ejected, the controller 180 may control the cold and hot water valve 660 to be opened toward the hot water module 170.

As another example, when cold water is ejected, the controller 180 may control the cold and hot water valve 660 to be opened toward the cold water flow path 750. The cold and hot water valve 660 may have one inlet and two outlets. In addition, the inlet of the cold and hot water valve 660 is connected to the intermediate flow path 720 extending toward the filter 120. Then, one of the two outlets is connected again to the intermediate flow path 720 extending toward the hot water module 170, and the other one thereof is connected to the cold water flow path 750.

The controller 180 may open and close the inlet of the cold and hot water valve 660 and may open and close the outlet of the cold and hot water valve 660. The controller 180 may select and open only any one of the outlets of the cold and hot water valve 660 and block the other one thereof. The controller 180 may open all outlets of the cold and hot water valve 660 and may block all outlets of the water ejection valve 670. Accordingly, the water flowing into the cold and hot water valve 660 may be discharged to the intermediate flow path 720 extending toward the hot water module 170 and supplied to the hot water module 170 or discharged to the cold water flow path 750.

As a modified example, after the hot water is ejected, the water is in a heated state, and the hot water flow path 740, the hot water module 170, and the hot water flow path 760 are also filled with hot water. In this situation, when the user ejects purified water, a problem occurs in that the hot water in the hot water flow path 740 or the hot water module 170 is ejected through the water ejection nozzle 430 before the purified water is ejected.

The controller 180 may control the temperature of the water ejected to the water ejection nozzle 430 through the cold water to be low. In this embodiment, when purified water is ejected within a preset reference time after hot water is ejected, the controller 180 opens the outlet of cold and hot water valve 660 toward the intermediate flow path 720 connected to the hot water module 170. and the outlet of cold and hot water valve 660 toward the cold water flow path 750 is also controlled to be opened.

Here, the 'reference time' may be set in various ways. For example, the 'reference time' may be set to 60 minutes.

In addition, after hot water is ejected, before the reference time elapses, when purified water is ejected, the controller 180 simultaneously opens both outlets of the cold and hot water valve 660, wherein the outlet thereof toward the cold water flow path 750 is controlled to be blocked after being opened for a first time and the outlet thereof toward the intermediate flow path 720 connected to the hot water module 170 is controlled to be opened for a second time longer than the first time. Here, the 'first time' and the 'second time' may be set in various ways. For example, the 'first time' may be set to 3 seconds.

In addition, the water discharged through the cold water flow path 750 and the hot water flow path 740 may be discharged through the water ejection nozzle 430 after being merged in the water ejection flow path 760. In addition, in the case of the present disclosure, when the ejection of hot water is finished and the ejection of purified water is performed, after hot water is ejected, an elapsed time is checked, and a portion of cold water can be selectively merged into the remaining water according to the elapsed time.

In addition, in the case of the present disclosure, when the ejection of hot water is finished and the ejection of purified water is performed, the temperature of the residual water of the hot water flow path 740, the water ejection flow path 760, the hot water module 170, or the water ejection valve 670 is checked, and according to the checked temperature, a portion of the cold water may optionally be merged into the residual water. Accordingly, when purified water is ejected through the hot water flow path, the problem of discharging hot water or lukewarm water at the initial stage when purified water is ejected due to residual hot water can be solved.

Again, referring to FIG. 5, at least one of a pressure reducing valve 610 configured to adjust the water pressure of water flowing thereinto from the water supply source, or a flow rate sensor 620 configured to check the flow rate of water passing through the water supply flow path 710 may be installed in the water supply flow path 710. For example, in the first water supply flow path 711, a pressure reducing valve 610 and a flow rate sensor 620 may be sequentially installed with respect to the flow direction of water.

In addition, the controller 180 may be connected to the flow rate sensor 620 to receive flow rate information detected by the flow rate sensor 620. In addition, by utilizing the received flow rate information, it is possible to control the output of the hot water module 170 or the auxiliary heater 650 to be described later.

The water purifier according to the present disclosure has a hot water sterilization function. Again, referring to FIG. 5, an auxiliary heater 650 for heating water flowing through the auxiliary flow path 730 may be installed in the auxiliary flow path 730. The auxiliary heater 650 may be formed behind the flow rate adjusting valve 640 with respect to the flow direction of water.

In addition, the controller 180 controls the overall operation of the auxiliary heater 650. During hot water sterilization, the controller 180 operates the auxiliary heater 650, and the hot water module 170 and the cold water module 150 stop operating. Then, the hot water heated while passing through the auxiliary heater 650 passes through the filter 120 and then flows in the direction of the water ejection nozzle 430.

As described above, when the auxiliary heater 650 is operated, the auxiliary flow path 730 in which the auxiliary heater 650 is installed, the filter 120, the intermediate flow path 720, the hot water flow path 740, the cold water flow path 750, and the water ejection flow path 760 may be sterilized by hot water.

In addition, the controller 180 controls the flow switching valve 630 so that the water of the first water supply flow path 711 flows to the auxiliary flow path 730 during hot water sterilization. In addition, the controller 180 may control the cold and hot water valve 660 so that water flowing through the intermediate flow path 720 after being discharged from the filter 120 flows toward the cold water flow path 750 or the hot water flow path 740. For example, the controller 180 may control the cold and hot water valve 660 so that water flowing through the intermediate flow path 720 after being discharged from the filter 120 flows toward the cold water flow path 750.

As another example, the controller 180 may control the cold and hot water valve 660 so that water flowing through the intermediate flow path 720 after being discharged from the filter 120 flows toward the hot water module 170 and the hot water flow path 740. As another example, the controller 180 can control the cold and hot water valve 660 so that water flowing through the intermediate flow path 720 after being discharged from the filter 120 flows toward the cold water flow path 750 and the hot water flow path 740. In this case, the water flowing through the intermediate flow path 720 after being discharged from the filter 120 may simultaneously flow toward the cold water flow path 750 and the hot water flow path 740.

In addition, after being discharged from the filter 120, the water flowing through the intermediate flow path 720 sequentially first flows toward the cold water flow path 750, and then flows toward the hot water flow path 740, or first flows toward the hot water flow path 740 and then may flow toward the cold water flow path 750. In addition, during hot water sterilization, the controller 180 may control the water ejection valve 670 so that water from the water ejection flow path 760 flows toward the water ejection nozzle 430 or the drain flow path 770.

For example, the controller 180 may control the water ejection valve 670 so that water flowing into the water ejection valve 670 through the water ejection flow path 760 flows toward the water ejection nozzle 430. As another example, the controller 180 may control the water ejection valve 670 so that the water flowing into the water ejection valve 670 through the water ejection flow path 760 flows toward the drain flow path 770.

As another example, the controller 180 can control the water ejection valve 670 so that the water flowing into the water ejection valve 670 through the water ejection flow path 760 flows toward the water ejection nozzle 430 and also flows toward the drain flow path 770. At this time, the water flowing into the water ejection valve 670 through the water ejection flow path 760 may simultaneously flow toward the water ejection nozzle 430 and the drain flow path 770.

In addition, the water flowing into the water ejection valve 670 through the water ejection flow path 760 may sequentially flow first toward the water ejection nozzle 430 and then flow toward the drain flow path 770, or flow first toward the drain flow path 770 and then flow toward the water ejection nozzle 430. In addition, the water purifier 10 of the present disclosure may further include a steam flow path 780 and a safety valve 190 for discharging steam generated when the hot water is heated in the hot water module 170. Accordingly, it is possible to prevent an excessive increase in pressure due to steam in the hot water tank included in the hot water module 170. The safety valve 190 is configured to be opened at a set pressure and may have various structures within a range in which steam inside the hot water tank can be smoothly discharged.

Meanwhile, the steam flow path 780 may also be connected to the drain flow path 770. Accordingly, the steam discharged from the hot water tank may also be discharged to the outside of the water purifier 10 through the drain flow path 770. According to the present disclosure as described above, since hot water sterilization is performed while continuous water ejection is performed, there is an advantage that foreign substances can be simultaneously removed while sterilization of the flow path and valve is performed by the flow rate.

According to the present disclosure, a portion of the hot water generated while sterilizing and washing the hot water in the entire flow path included in the water purifier is discharged to the water ejection nozzle, and the rest is drained to the outside of the water purifier, so that a large amount of hot water is discharged through the water ejection nozzle, and thus there is also an advantage in that it is possible to prevent safety accidents such as burns that may occur, and to prevent the hassle that a large amount of hot water has to be processed by user.

An aspect of the present disclosure is to provide a water purifier capable of reducing material costs due to the provision of a purified water flow path and a water purification valve by implementing a flow path to eject hot water and purified water through a hot water flow path without having a purified water flow path and a water purification valve, separately. In addition, an aspect of the present disclosure is to provide a water purifier capable of reducing the size of the water purifier by eliminating the configuration of the purified water flow path and the water purification valve, thereby increasing the use of space inside the water purifier.

In addition, an aspect of the present disclosure is to provide a water purifier capable of securing an ejection flow rate of purified water while satisfying a temperature condition of hot water by separately forming a flow path for water flowing to a filter when hot water is ejected and purified water is ejected. In addition, an aspect of the present disclosure is to provide a water purifier capable of maintaining a temperature condition of the ejected purified water to a satisfaction state by discharging the residual water after hot water is ejected so that the temperature of the ejected purified water does not increase due to the residual hot water, in a case where purified water is ejected after hot water is ejected. In addition, an aspect t of the present disclosure is to provide a water purifier capable of heating water flowing toward the filter and then supplying it to the filter, so that hot water sterilization can be performed up to the water ejection nozzle as well as the pipe and valve disposed between the filter and the water ejection nozzle.

In order to achieve the above aspects, the present disclosure provides a water purifier including a housing forming a storage space; a filter provided inside the housing to purify water supplied from an external water supply source; a water supply flow path configured to guide the water supplied from the water supply source toward the filter; an auxiliary flow path configured to branch off at the first point of the water supply flow path and then to merge into a second point of the water supply flow path located at a rear end of the first point based on the flow direction of water; a flow switching valve configured to be installed at the first point to control the flow of water flowing from the water supply flow path to the auxiliary flow path; a water ejection nozzle provided on the outside of the housing and through which water passing through the filter is ejected; a hot water module forming a heating flow path through which the purified water passing through the filter passes and configured to heat the purified water passing through the heating flow path into hot water when hot water is ejected; a hot water flow path configured to guide the hot water passing through the hot water module toward the water ejection nozzle; and a controller configured to control the operation of the flow switching valve and the hot water module.

The controller may be configured to control the flow switching valve so that the water in the water supply flow path passes through the auxiliary flow path when hot water is ejected. The controller may be configured to control the flow switching valve so that the water in the water supply flow path flows only through the water supply flow path.

A flow rate adjusting valve may be installed in the auxiliary flow path. An auxiliary heater configured to heat the water flowing through the auxiliary flow path may be installed in the auxiliary flow path. When sterilizing hot water, the controller may be configured to operate the auxiliary heater, and the hot water heated while passing through the auxiliary heater passes through the filter and then flow in the direction of the water ejection nozzle.

The water purifier may further include a water ejection flow path having one side connected to the hot water flow path and the other side connected to the water ejection nozzle, and a water ejection valve configured to control the flow of water flowing toward the water ejection nozzle may be installed in the water ejection flow path.

The water ejection valve may be provided as a three-way valve, and a drain flow path is connected to the water ejection valve, and the water ejection valve may flow the water flowing thereinto toward the water ejection nozzle or to the drain flow path. When hot water is ejected, the water ejection valve may be opened toward the water ejection nozzle, and when the ejection of the hot water is finished, the water ejection valve may be opened toward the drain flow path to drain the remaining water.

When purified water is ejected, the controller may be configured to turn off the hot water module, and the purified water discharged from the hot water module may be ejected to the water ejection nozzle through the hot water flow path. When hot water is ejected, the controller may be configured to turn on the hot water module, and the hot water discharged from the hot water module may be ejected to the water ejection nozzle through the hot water flow path.

The water purifier may further include an intermediate flow path having one end connected to the outlet side of the filter and the other end connected to the inlet side of the hot water module to guide the water passing through the filter toward the hot water module; a cold water flow path having one side branched from the intermediate flow path and the other side merged into the water ejection flow path connected to the water ejection nozzle; and a cold water module installed in the cold water flow path to cool the purified water passing through the cold water flow path into cold water.

A cold and hot water valve may be installed at a branch point of the cold water flow path in the intermediate flow path, when hot water is ejected or purified water is ejected, the cold and hot water valve may be opened toward the hot water module, and when cold water is ejected, the cold and hot water valve may be opened toward the cold water flow path. After hot water is ejected, when purified water is ejected within the first preset hour, the cold and hot water valve may be opened toward the hot water module and the cold water flow path.

In the water supply flow path, at least one of a pressure reducing valve configured to adjust the water pressure of water flowing thereinto from the water supply source or a flow rate sensor configured to check a flow rate of water passing through the water supply flow path may be installed. In addition, the water discharged through the cold water flow path and the hot water flow path may be merged and then discharged through the water ejection nozzle.

The present disclosure has the advantage of capable of reducing material costs due to the provision of a purified water flow path and a water purification valve by implementing a flow path to eject hot water and purified water through a hot water flow path without having a purified water flow path and a water purification valve, separately. In addition, there is an advantage that the space utilization inside the water purifier can increase, and the size of the water purifier can be reduced, since the configuration of the purified water flow path and the water purification valve can be eliminated.

In addition, there is an advantage that it is possible to reduce maintenance costs such as pipe replacement costs that are performed periodically, since the configuration of the purified water flow path and the water purification valve can be eliminated. In addition, there is an advantage that the ejection flow rate of purified water can be secured while satisfying the temperature condition of hot water by separately forming a flow path for water flowing to the filter when hot water is ejected and purified water is ejected.

In addition, there is an advantage that a temperature condition of the ejected purified water is capable of being maintained to a satisfaction state by discharging the residual water after hot water is ejected so that the temperature of the ejected purified water does not increase due to the residual hot water, in a case where purified water is ejected after hot water is ejected. In addition, there is an advantage that a temperature condition of the ejected purified water is capable of maintained to a satisfaction state by lowering the temperature of the water ejected through the cold water so that the temperature of the ejected purified water does not increase due to the residual hot water in a case where purified water is ejected after hot water is ejected.

In addition, there is an advantage that hot water sterilization is capable of performing to the water ejection nozzle as well as the pipe and valve disposed between the filter and the water ejection nozzle with respect to the flow direction of the water by supplying the water toward the filter after heating the water flowing toward the filter. In addition, there is an advantage that foreign substances is capable of being removed simultaneously while sterilization of the flow path and valve is performed by the flow rate since hot water sterilization is performed while continuous ejection water is performed.

In addition, there is an advantage that some of the hot water generated during hot water sterilization and hot water washing of the flow path and valve included in the water purifier is discharged to the water ejection nozzle, and the rest is capable of being drained to the outside of the water purifier, so that while a large amount of hot water is discharged to the water ejection nozzle, it is possible to prevent safety accidents such as burns that may occur, and to avoid the hassle of processing a large amount of hot water by user.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser which ejects hot liquid and purified liquid at an ambient temperature, the liquid dispenser comprising:
    a housing forming a storage space;
    a filter provided inside the housing to purify liquid supplied from an external liquid supply source;
    a liquid supply flow path configured to guide liquid supplied from the liquid supply source toward the filter;
    an auxiliary flow path configured to branch off at a first point of the liquid supply flow path and then to merge into a second point of the liquid supply flow path located downstream of the first point;
    a flow switching valve installed at the first point and configured to control a flow of liquid from the liquid supply flow path to the auxiliary flow path;
    a liquid ejection nozzle provided on the outside of the housing and through which liquid passing through the filter is ejected;
    a heating module included in a heating flow path through which purified liquid from the filter passes and configured to heat liquid passing along the heating flow path into hot liquid;
    a hot liquid flow path configured to guide hot liquid from the heating module toward the liquid ejection nozzle;
    a controller configured to control operation of the flow switching valve and the heating module, and
    an auxiliary heater configured to heat liquid flowing through the auxiliary flow path and installed in the auxiliary flow path.

2. The liquid dispenser of claim 1, wherein the controller is configured to control the flow switching valve so that the liquid in the liquid supply flow path passes through the auxiliary flow path when hot liquid is ejected from the liquid ejection nozzle.

3. The liquid dispenser of claim 1, wherein the controller is configured to control the flow switching valve so that the liquid in the liquid supply flow path flows only through the liquid supply flow path.

4. The liquid dispenser of claim 1, further comprising a flow rate adjusting valve installed in the auxiliary flow path.

5. The liquid dispenser of claim 1, wherein the controller is configured to operate the auxiliary heater such that liquid passing through the auxiliary heater is heated to form a sterilizing hot liquid that passes through the filter and then flows toward the liquid ejection nozzle.

6. The liquid dispenser of claim 1, further comprising:
    a liquid ejection flow path having a first side connected to the hot liquid flow path and a second side connected to the liquid ejection nozzle; and
    a liquid ejection valve configured to control a flow of liquid flowing toward the liquid ejection nozzle and installed in the liquid ejection flow path.

7. The liquid dispenser of claim 6, wherein the liquid ejection valve is provided as a three-way valve, and a drain flow path is connected to the liquid ejection valve, and
    wherein the liquid ejection valve flows the liquid flowing thereinto toward the liquid ejection nozzle or to the drain flow path.

8. The liquid dispenser of claim 7, wherein, when hot liquid is to be ejected from the liquid ejection nozzle, the liquid ejection valve is opened toward the liquid ejection nozzle, and
    wherein, when ejection of hot liquid is finished, the liquid ejection valve is opened toward the drain flow path to drain remaining liquid.

9. The liquid dispenser of claim 1, wherein, when purified liquid at the ambient temperature is to be ejected from the liquid ejection nozzle, the controller is configured to turn off the heating module, and the purified liquid at the ambient temperature is discharged from the heating module and to the liquid ejection nozzle through the hot liquid flow path.

10. The liquid dispenser of claim 1, wherein, when hot liquid is to be ejected from the liquid ejection nozzle, the controller is configured to turn on the heating module, and hot liquid discharged from the heating module is ejected to the liquid ejection nozzle through the hot liquid flow path.

11. The liquid dispenser of claim 1, further comprising:
    an intermediate flow path having a first end connected to an outlet side of the filter and a second end connected to an inlet side of the heating module to guide filtered liquid from the filter and toward the heating module;
    a cold liquid flow path having a first side branched from the intermediate flow path and a second side merged into the liquid ejection flow path connected to the liquid ejection nozzle; and
    a cooling module installed in the cold liquid flow path to cool purified liquid passing through the cold liquid flow path to form cold liquid.

12. The liquid dispenser of claim 11, wherein a cold and hot liquid valve is installed at a branch point of the cold liquid flow path in the intermediate flow path,
    wherein, when hot liquid or purified liquid at an ambient temperature is to be ejected from the liquid ejection nozzle, the cold and hot liquid valve is opened to guide purified liquid toward the heating module, and
    wherein, when cold liquid is ejected, the cold and hot liquid valve is opened to guide purified liquid toward the cold liquid flow path.

13. The liquid dispenser of claim 12, wherein after hot liquid is ejected, when purified liquid at an ambient temperature is to be ejected within a first hour, the cold and hot liquid valve is opened toward the heating module and the cold liquid flow path.

14. The liquid dispenser of claim 1, further comprising, in the water supply flow path, at least one of a pressure reducing valve configured to adjust the liquid pressure of liquid flowing thereinto from the liquid supply source or a flow rate sensor configured to check a flow rate of liquid passing through the liquid supply flow path.

15. A liquid dispenser comprising:
a housing forming a storage space;
a liquid supply flow path configured to guide liquid supplied from the liquid supply source;
an auxiliary flow path configured to branch off at a first point of the liquid supply flow path and then to merge into a second point of the liquid supply flow path located downstream of the first point;
a flow switching valve installed at the first point and configured to control a flow of liquid from the liquid supply flow path to the auxiliary flow path;
an auxiliary heater installed in the auxiliary flow path and configured to heat liquid flowing through the auxiliary flow path to form a sterilizing hot liquid that flows toward the liquid ejection nozzle;
a liquid ejection nozzle provided on the outside of the housing and through which liquid is ejected;
a heating module included in a heating flow path through which liquid passes from the liquid supply flow path, the heating module being configured to heat liquid passing along the heating flow path into hot liquid;
a hot liquid flow path configured to guide hot liquid from the heating module toward the liquid ejection nozzle; and
a controller configured to control operation of the flow switching valve, the heating module, and the auxiliary heater.

16. The liquid dispenser of claim 15, wherein the controller is configured to control the flow switching valve so that the liquid in the liquid supply flow path passes through the auxiliary flow path when hot liquid is to be ejected from the liquid ejection nozzle.

17. The liquid dispenser of claim 15, further comprising
a liquid ejection flow path having a first side connected to the hot liquid flow path and a second side connected to the liquid ejection nozzle; and
a liquid ejection valve configured to control a flow of liquid flowing toward the liquid ejection nozzle and installed in the liquid ejection flow path,
wherein the liquid ejection valve is provided as a three-way valve, and a drain flow path is connected to the liquid ejection valve,
wherein the liquid ejection valve flows the liquid flowing thereinto toward the liquid ejection nozzle or to the drain flow path,
wherein, when hot liquid is ejected from the liquid ejection nozzle, the liquid ejection valve is opened toward the liquid ejection nozzle, and
wherein, when ejection of hot liquid is finished, the liquid ejection valve is opened toward the drain flow path to drain remaining liquid.

18. The liquid dispenser of claim 15, wherein, when liquid at the ambient temperature is to be ejected from the liquid ejection nozzle, the controller is configured to turn off the heating module, and liquid at the ambient temperature is discharged from the heating module and to the liquid ejection nozzle through the hot liquid flow path, and
wherein, when hot liquid is to be ejected from the liquid ejection nozzle, the controller is configured to turn on the heating module, and hot liquid discharged from the heating module is ejected to the liquid ejection nozzle through the hot liquid flow path.

19. The liquid dispenser of claim 15, further comprising:
an intermediate flow path having a first end connected to an outlet side of the liquid supply flow path and a second end connected to an inlet side of the heating module to guide liquid between the liquid supply flow path and the heating module;
a cold liquid flow path having a first side branched from the intermediate flow path and a second side merged into the liquid ejection flow path connected to the liquid ejection nozzle;
a cooling module installed in the cold liquid flow path to cool liquid passing through the cold liquid flow path to form cold liquid; and
a cold and hot liquid valve is installed at a branch point of the cold liquid flow path in the intermediate flow path,
wherein, when hot liquid or liquid at an ambient temperature is to be ejected, the cold and hot liquid valve is opened to guide liquid to flow toward the heating module, and
wherein, when cold liquid is to be ejected, the cold and hot liquid valve is opened to guide liquid to flow toward the cold liquid flow path.

* * * * *